United States Patent [19]

Katou

[11] Patent Number: 4,751,599
[45] Date of Patent: Jun. 14, 1988

[54] THIN-FILM MAGNETIC HEAD WITH A COIL CONDUCTOR HAVING A PLURALITY OF TURNS OF DIFFERENT WIDTHS

[75] Inventor: Yoshiaki Katou, Kaisei, Japan

[73] Assignee: Fuji Photo Film Co., Ltd., Japan

[21] Appl. No.: 760,279

[22] Filed: Jul. 29, 1985

[30] Foreign Application Priority Data

Aug. 6, 1984 [JP] Japan .................... 59-164586

[51] Int. Cl.⁴ .................... G11B 5/147; G11B 5/17
[52] U.S. Cl. .................... 360/126; 360/123; 360/119
[58] Field of Search ............ 360/123, 126, 127, 119, 360/120, 125, 110; 29/603

[56] References Cited

U.S. PATENT DOCUMENTS

| | | | |
|---|---|---|---|
| 3,987,488 | 10/1976 | Kanai et al. | 360/123 |
| 4,246,620 | 1/1981 | Kaminaka et al. | 360/127 |
| 4,295,173 | 10/1981 | Romankiw et al. | 360/122 |
| 4,458,279 | 7/1984 | Katz | 360/123 |
| 4,652,957 | 3/1987 | Schewe et al. | 360/123 X |

FOREIGN PATENT DOCUMENTS 0212615 12/1983 Japan .................... 360/125
0107717 6/1985 Japan .................... 29/603

OTHER PUBLICATIONS

IBM Technical Disclosure Bulletin, vol. 15, No. 7, Dec. 1972, Laminated Multiturn Magnetic Head, Jones et al.

Primary Examiner—Robert S. Tupper
Assistant Examiner—Andrew L. Sniezek
Attorney, Agent, or Firm—Pasquale A. Razzano

[57] ABSTRACT

A thin-film magnetic head is composed of a lower magnetic layer, a first insulating layer, a coil conductor, a second insulating layer, a gapping layer disposed on the second insulating layer and having an end exposed for sliding contact with a magnetic recording medium for recording signals on and reproducing signals from the magnetic recording medium, and an upper magnetic layer disposed on the gapping layer. The coil conductor has a plurality of turns including an outermost turn having a portion which is closest to the end of the gapping layer and which has a width larger than that of each of the other turns. The coil turns may also include an innermost turn having a portion which is remote from the end of the gapping layer and which has a width larger than that of each of the other turns except the portion of the outermost turn.

2 Claims, 2 Drawing Sheets

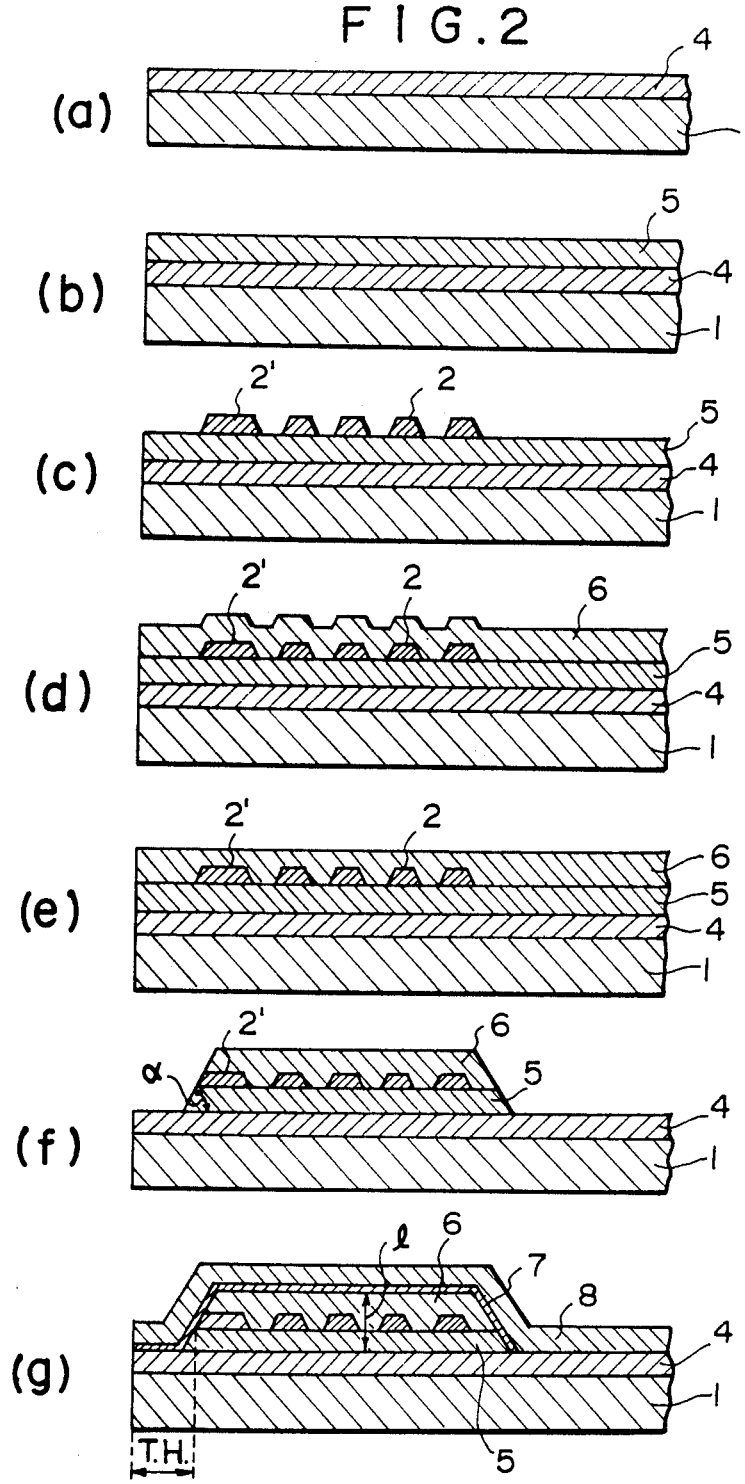

THIN-FILM MAGNETIC HEAD WITH A COIL CONDUCTOR HAVING A PLURALITY OF TURNS OF DIFFERENT WIDTHS

BACKGROUND OF THE INVENTION

1. Field of the Invention

The present invention relates to a thin-film magnetic head for recording signals on and reproducing signals from a magnetic recording medium, the thin-film magnetic head being of a laminated structure comprising magnetic layers, a coil conductor, a gapping layer, and insulating layers which are successively deposited and etched as thin films on a substrate, with the gapping layer having an end face positioned for sliding contact with the magnetic recording medium, and more particularly to an improved structure of the coil conductor in the thin-film magnetic head.

2. Description of the Prior Art

There have heretofore been developed various magnetic recording and reproducing apparatus for recording and reproducing various signals. As recent years have seen miniaturization and diversification in the shape of magnetic recording mediums, efforts have also been made to develop magnetic heads suitable for recording information on and reproducing recorded information from such magnetic recording mediums. For example, there is known a small-size disc-shaped magnetic recording medium in which the intermost circular recording track has a radius of 15 mm and the outermost circular recording track has a radius of 20 mm. The magnetic heads for recording signals on and reproducing signals from such small-size disc-shaped magnetic recording mediums are required to be smaller in size. To meet this requirement, thin-film magnetic heads are with increasing frequency being used in place of conventional bulk-type magnetic heads. The thin-film magnetic heads are finding wide use as smaller-size magnetic heads also for their multichannel recording and reproducing capability.

The thin-film magnetic head is manufactured in the manner described below. A lower magnetic layer is deposited as a thin film on a substrate, and then a first insulating layer is deposited as a thin film on the lower magnetic layer. Thereafter, a coil conductor is deposited as a thin film on the first insulating layer and then etched into a coil, followed by the deposition of a second insulating layer as a thin film on the laminated body. After the first and second insulating layers are etched into a tapered configuration, a gapping layer and an upper magnetic layer are deposited as thin films on the lamination. For an improved signal recording and reproducing efficiency, it is preferable to keep the upper and lower magnetic layers spaced from each other by a sufficient distance and also to minimize the distance (known as the "throat height" (T.H.)) from the head surface for sliding contact with the magnetic recording medium to the outermost peripheral portion of the coil conductor. If the distance between the upper and lower insulating layers should be increased to a substantial extent, a resist film on the upper insulating layer would be etched and retracted at the time of etching the upper and lower insulating layers into a tapered shape at a certain taper angle. This would lead to the drawback that the outermost peripheral portion of the coil conductor closest to the sliding contact surface of the magnetic head would be thinned out upon etching. In order to prevent the thinned coil conductor from being burned out by a recording current flowing therethrough, the second insulating layer would have to be left on the surface of the coil conductor close to the sliding contact surface of the magnetic head for protecting the coil conductor from being etched. With such a proposed arrangement, however, the throat height would be increased, and good signal recording and reproducing efficiency would not be achieved.

SUMMARY OF THE INVENTION

It is an object of the present invention to provide a thin-film magnetic head of a laminated construction including a coil conductor shaped such that it will not be etched to an extent smaller than a required width when the laminated construction is etched into a tapered configuration, so that the coil conductor will not be burned out when a recording current flows therethrough.

Another object of the present invention is to provide a thin-film magnetic head which can be manufactured at a high yield rate.

Still another object of the present invention is to provide a thin-film magnetic head having a sufficiently small throat height for efficiently recording signals and reproducing signals from a magnetic recording medium.

According to the present invention, a thin-film magnetic head of a laminated construction includes a coil conductor composed of a plurality of turns including an outermost turn having a portion which is closest to the sliding contact surface of the magnetic head and which has a width larger than that of each of the other turns. The width of the outermost turn portion is selected to remain large enough, after the coil conductor has been etched to a tapered configuration, not to be burned out when a recording current flows therethrough.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2(a) through 2(g) are enlarged cross-sectional views taken along line II—II of FIG. 1, showing progressive steps of manufacturing the thin-film magnetic head shown in FIG. 1.

DESCRIPTION OF THE PREFERRED EMBODIMENT

Figure 1:
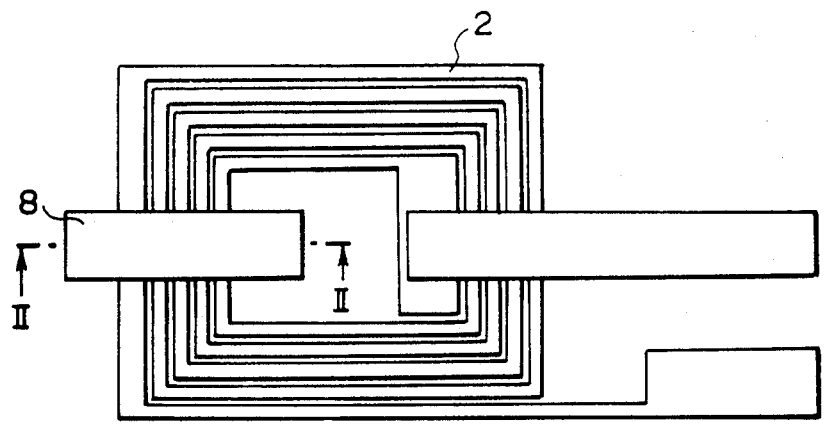
FIG. 1 is a plan view of a thin-film magnetic head according to an embodiment of the present invention.

FIG. 1 shows a thin-film magnetic head according to the present invention, and FIGS. 2(a) through 2(g) illustrate the process by which the thin-film magnetic head of FIG. 1 is manufactured in successive steps. As shown in FIG. 2(g), the thin-film magnetic head is essentially composed of a substrate 1 made of a magnetic material such as ferrite or a nonmagnetic material such as aluminum oxide ($Al_2O_3$), a lower magnetic layer 4, a first insulating layer 5, a coil conductor 2, a second insulating layer 6, and an upper magnetic layer 8. The layers are successively deposited as thin films and patterned according to the progressive process shown in FIGS. 2(a) through 2(g).

According to the illustrated process, the lower magnetic layer 4 is first formed on the substrate 1 by depositing a magnetic material such as permalloy or an amorphous material on the substrate 1 by way of evaporation, sputtering, or another suitable deposition method as shown in FIG. 2(a). Then, the first insulating layer 5, which is made of silicon dioxide ($SiO_2$) or aluminum oxide ($Al_2O_3$), is deposited on the lower magnetic layer 4 as by evaporation or sputtering as shown in FIG. 2(b) After a film of aluminum or copper is deposited on the first insulating layer 5 as by evaporation or sputtering, the coil conductor 2 is formed on the thin film as by ion etching as illustrated in FIG. 2(c). The coil conductor 2 thus deposited comprises a plurality of turns, and the outermost one of the turns includes a portion 2' which is closest to the surface of the magnetic head for sliding contact with a magnetic recording medium and which has a width larger than the width of each of the other turns. Then, the second insulating layer 6 is deposited as shown in FIG. 2(d) in the same manner as the first insulating layer 5, and the upper surface of the second insulating layer 6 is flattened as by ion etching as illustrated in FIG. 2(e). The opposite side edges of the first and second insulating layers 5, 6 are thereafter tapered at an angle α as by ion etching as shown in FIG. 2(f). Since the outermost coil turn portion 2' is initially larger in width than the other coil turns, it retains a sufficient width even when it is etched upon tapering the side edges of the first and second insulating layers 5, 6 with a resist film (not shown) on the second insulating layer 6 being retracted. Therefore, the outermost coil turn portion 2' is prevented from being cut off upon etching or from being so thinned that it will be burned out when a recording current flows therethrough. After the first and second insulating layers 5, 6 have been tapered at their side edges by etching, a continuous gapping layer 7 is deposited on the lower magnetic layer 4, the second insulating layer 6, and the tapered surfaces as by sputtering silicon dioxide ($SiO_2$), aluminum oxide ($Al_2O_3$), or the like. The gapping layer 7 has one end (shown on the lefthand side in FIG. 2(g)) exposed for sliding contact with the magnetic recording medium. Then, the portion of the gapping layer 7 which is deposited on the lower magnetic layer 4 remotely from the sliding contact surface of the magnetic head is etched away. The gapping layer 7 has a thickness selected to establish a desired gap length. Finally, the upper magnetic layer 8 is continuously formed on the gapping layer 7 and the lower magnetic layer 4 by depositing the same magnetic material as that of the lower magnetic layer 4 as by evaporation or sputtering.

While the coil conductor 2 has five turns in the above embodiment shown in FIG. 1, it may be composed of more or less turns as desired.

Since the outermost coil turn portion 2' is greater in width than the other coil turns, the coil conductor 2 can be exposed on the tapered surface of the outermost coil turn portion 2', i.e., it is not necessary to leave the second insulating layer 6 on the outward surface of the outermost coil turn portion 2'. Therefore, the throat height (T.H.) is smaller than that in conventional thin-film magnetic heads. The reduced throat height results in an increased efficiency for recording and reproducing signals. With the outermost coil turn portion 2' free from the danger of being cut off at the time of fabrication, thin-film magnetic heads can be produced at an increased yield rate. The time when the etching of the first and second insulating layers 5, 6 to form the tapered surfaces is to be completed can accurately be determined simply by detecting when the outermost coil turn portion 2' becomes visible in the second insulating layer 6 in the etching process. Furthermore, the upper and lower magnetic layers 4, 8 can be kept spaced across the first and second insulating layers 5, 6 and the coil conductor 2 by a distance l which remains the same as that in prior thin-film magnetic heads.

Figure 3:
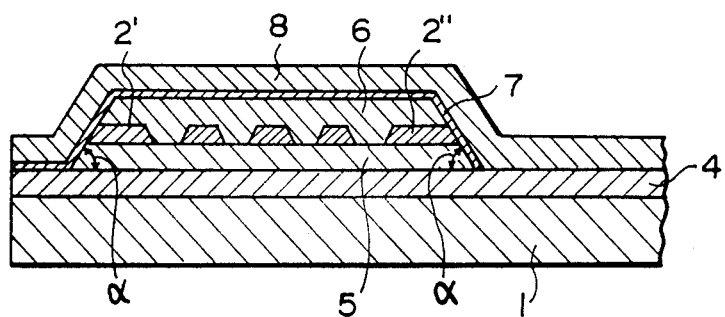
FIG. 3 is a fragmentary cross-sectional view of a thin-film magnetic head according to another embodiment of the present invention.

FIG. 3 shows a thin-film magnetic head according to another embodiment of the present invention, the view illustrating a cross-sectional configuration similar to that shown in FIG. 2(g). The thin-film magnetic head has a coil conductor including an outermost coil turn portion 2' closest to the sliding contact surface of the magnetic head and an innermost coil turn portion 2" remote from the sliding contact surface thereof. The outermost and innermost coil turn portions 2', 2" have widths larger than those of the other coil turns. The magnetic head shown in FIG. 3 has a reduced throat height (T.H.). Since both of the outermost and innermost coil turn portions 2', 2" are prevented from being excessively thinned or cut off when the coil conductor is tapered at its side edges by etching,-the angle α at which the coil turn portions 2', 2" are tapered can be increased, and the length of the magnetic path can be reduced.

Although certain preferred embodiments have been shown and described, it should be understood that many changes and modifications may be made therein without departing from the scope of the appended claims.

What is claimed is:

1. A thin-film magnetic head comprising a substrate having thereon a lower magnetic layer, a coil conductor, an upper magnetic layer, accumulated in this order, said magnetic layers having first exposed end portions; a gapping layer positioned between said upper and lower magnetic layers; said gapping layer including an exposed end located between said first exposed end portions of said upper and lower magnetic layers and defining with said exposed end portions of the magnetic layers a surface for sliding contact with a magnetic recording medium for recording signals on and reproducing signals from the magnetic recording medium; said coil conductor being composed of a plurality of turns including an outermost turn having a portion which is adjacent and parallel to said exposed end of said gapping layer and inwardly thereof with respect to said surface; said portion of the outermost turn of the coil parallel to said exposed end of said gapping layer having a width larger than that of each of the other turns, whereby no portion of the coil is located at the gap between said upper and lower magnetic layers at said surface.

2. A thin-film magnetic head according to claim 1, wherein said turns include an innermost turn having a portion which is remote from said end of said gapping layer and which has a width larger than that of each of the other turns except said portion of the outermost turn.

* * * * *